Patented Feb. 27, 1940

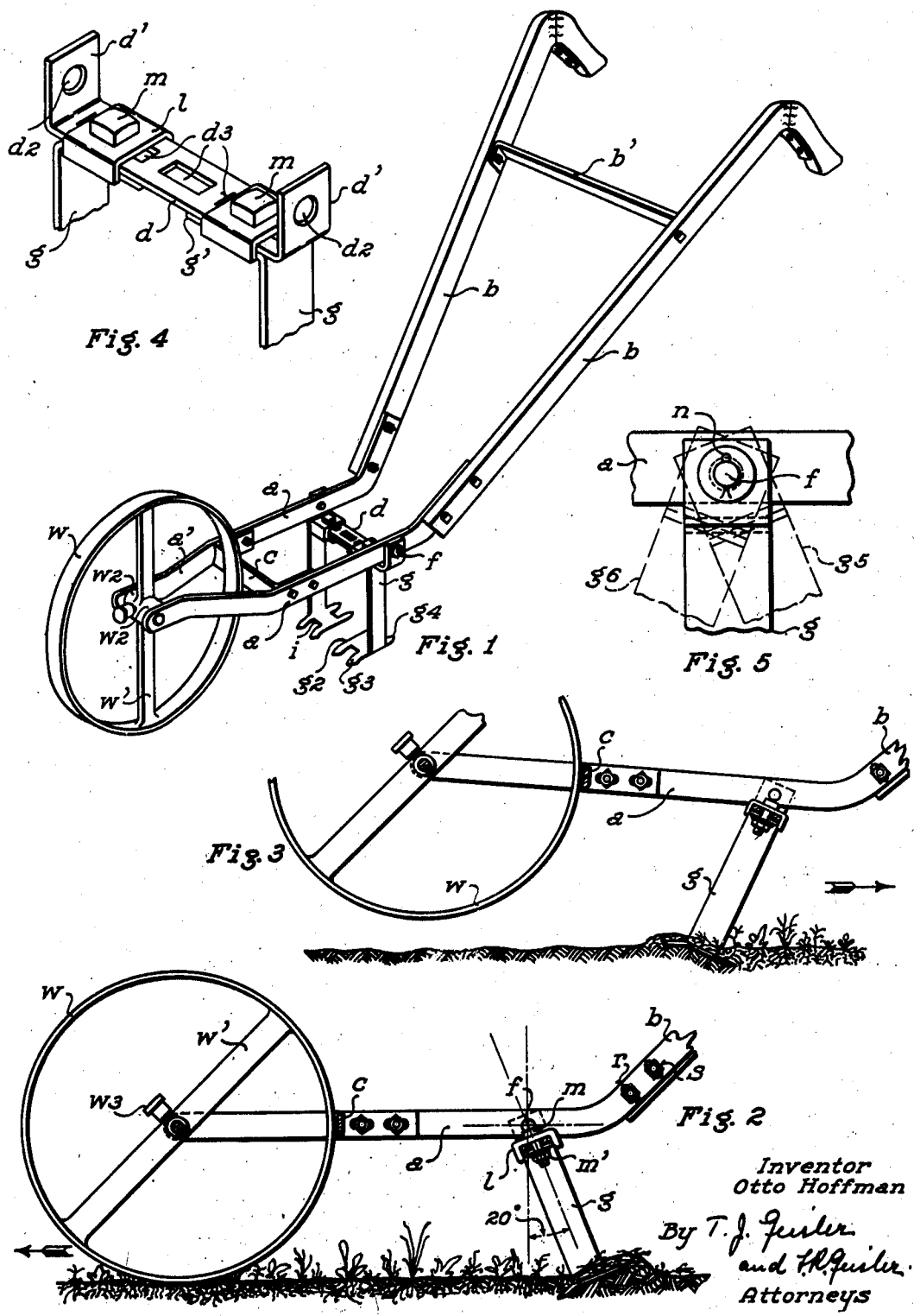

2,191,741

UNITED STATES PATENT OFFICE 2,191,741

ADJUSTABLE CULTIVATING IMPLEMENT

Otto Hoffman, Washington County, Oreg.

Application June 6, 1938, Serial No. 212,048

4 Claims. (Cl. 97—59)

This application is a continuation in part of my application filed July 27, 1937, Serial No. 155,939.

Experience in gardening teaches that it is not practical to use one or two implements for doing all the required cultivation of the ground. In short, different tools, especially adapted for doing different phases or stages of gardening work are best. On the other hand, it is unhandy to be obliged to have on hand a number of special implements. In my opinion, it is desirable to have a single implement by which all light gardening work can be done, such implement being adapted for use in the different stages of work by providing the implement with a series of particular tool attachments, or working parts, which may be interchangeably substituted one for the other.

The object of my invention is to provide a cultivating implement by which interchangeable working tools may be used; the interchangeable tools, or working parts, being adapted to perform all work required for the initial breaking up of the soil, then pulverizing it and maintaining the soil loose and pulverized and free from weeds. A further purpose of my invention is to make the working parts which may be interchangeably used on my implement adjustable as to their operating width. In other words, adjustable relatively to the width of the strip of ground between the rows of vegetation.

A further purpose of my invention is to facilitate the work done by my implement by enabling the operator to control the depth of penetration into the ground of the working part used on my implement; such control being applied by the mere direction—forward or backward—in which my implement is moved over the ground, and the lowering and raising of the handle bars of the implement by the operator.

A further purpose of my invention is to provide an implement which is light of weight, therefore easy to handle, and besides relatively inexpensive to manufacture, so that my implement is available to all doing gardening on a relatively small scale.

The above described and other incidental features and details of my implement are fully brought out in the description of the construction and use thereof hereinafter given, with reference to the accompanying drawing.

In the drawing:

Fig. 1 shows a perspective elevation of my implement carrying the working part or attachment for performing the initial gardening work—breaking up and pulverizing loamy, or more or less heavy soil;

Figs. 2 and 3 show each in longitudinal section the lower part of my implement carrying the same tool or working attachment as shown by Fig. 1; Fig. 2 illustrating the effect of, and work done on the soil by pushing my implement forward; and Fig. 3 the work done when pulling my implement backward;

Fig. 4 shows in perspective a detail of the slotted cross-bar rockably carried by the frame of my implement, to which cross-bar the interchangeable particular working tools or parts are attached; and Fig. 5 shows a detail of construction of said rockable cross-bar hereinafter fully described.

My implement comprises, as shown in Fig. 1, a frame consisting of spaced side members $a$ having attached thereto wooden handle bars $b$. The frame members $a$ are connected by a rigid cross-bar $c$ and the handle bars by a rigid cross-bar $b'$. In the frame members $a$ is rockably mounted a working-tool carrying cross-bar $d$. The forward ends of the frame members $a$ are brought together as at $a'$ and between them is journaled a ground wheel $w$ which may be of any convenient manufacture; but the ground wheel, for cheapness of design, may be constructed as hereinafter described. The rotatable cross-bar $d$ illustrated in detail by Fig. 4, consists of a metal piece, the ends $d'$ of which may be bent up, and these ends are provided with holes $d2$ for the trunnion pins $f$. The cross-bar $d$ is provided with a series of longitudinal slots $d3$, and to this cross-bar $d$ is fixed the working tool or attachment to be used. The working tool attachment shown by Fig. 1 is adapted to perform the initial breaking up and subsequent pulverizing of the soil. This tool consists of two identical companion parts removably and adjustably affixed to the cross-bar $d$, as illustrated by Figs. 1 and 4. Each part of the tool preferably consists of a shank $g$ having a bent and slotted upper end $g'$, and a bent lower end or blade $g2$ provided with a series of teeth, $g3$ and $g4$, on both sides. The edges $e$ of the shank $g$ and the points of the teeth $g3$ and $g4$ should be beveled to a cutting edge; and likewise the edges $i$ between the teeth are to be beveled to a cutting edge.

In attaching a working tool to the rockable cross-bar $d$, I preferably used a clamp $l$ (see Fig. 4) to which are preferably welded the heads of bolts $m$ inserted thru the slots $d3$ of the cross-bar $d$, and thru the forked upper lateral portions $g'$ of the tool $g$; nuts $m'$ being threaded on the said bolts $m$ to clamp the tool in place. The tool-carrying cross-bar $d$ is rockably supported in the frame members $a$ by the trunnion pins $f$ inserted thru the bent ends $d'$ of the cross-bar, and said frame members $a$; the trunnion pins $f$ being secured in place by cotter keys $n$. The tool-carrying bar $d$ is free to rock 20 degrees, approximately, relative to frame in either direction. The angular positions of the bar $d$ are indicated by $g5$ and $g6$ in Fig. 5 and are assumed in response to the implement being pushed forward or pulled back by the operator. This limitation of rocking is effected by the ends of the tool-carrying bar $d$ coming into contact with the frame members $a$.

Describing now the operation of the working parts of my implement: The teeth $g^3$ on the front side of the blade portion $g^2$ of the tool $g$ should be bent downward about 15 degrees from the plane of the blade $g^2$. The purpose of this construction is to cause the front teeth $g^3$ to dig into the soil and break it up, and pulverize the ground and cut the weeds in the forward movement of my implement. The first breaking up of the ground should be accomplished by causing the front teeth $g^3$ to penetrate about one inch deep into the soil, which is effective to break up the surface, cut the weeds and also perform initial pulverizing of the soil without causing the blade portion of this tool to enter the ground to such depth as to make the work hard. The operating width of the strip of soil of the work done by the tool $g$ is adjustable relatively to the strip of ground to be cultivated, by moving the companion parts of this tool $g$ together and apart as required. I prefer to make the setting of the parts of this tool about one inch apart for the initial work. These tool parts may be made with teeth $h$ where a wide strip of ground is to be worked. The operator can control the depth to which the forwardly projecting teeth $g^3$ enter the ground by raising and lowering the handle bars; thus regulating the pressure applied to the teeth $g^3$ in similar manner as one would use a hoe with more or less force upon the ground.

In the forward movement of my implement, the weight of the wheel $w$ also helps to cause the teeth of blade $g^2$ to dig into the ground. The operation of my implement, when carrying a tool attachment as $g$, is illustrated by Fig. 2. When the operator draws the implement back towards him, he must push down on the handle bars, and in so doing more or less raise the wheel $w$ off the ground, as illustrated by Fig. 3. The operator in drawing the implement towards him further breaks up and pulverizes the soil and cuts down the weeds. The forward and backward movement of my implement is repeated until the soil has been worked to the desired degree of fineness.

In the movement of my implement forward and backward over the ground, the bar $d$ and the tool carried thereby is rocked in a direction opposite to that in which the implement is moved, as mentioned; such rocking being limited to an arc of 20 degrees, approximately, from a line normal to the frame members $a$, by the ends of the tool-carrying bar $d$ coming in contact with the frame members $a$. The angle which the tool so assumes enables it to do better work. When using a tool as $g$, the forward and backward movement of the implement effects a harrowing action and thus thorough pulverizing of the soil. The handle bars $b$ of my implement are adjustable, and may be raised or lowered as convenient to the operator. For such purpose the holes $r$ thru which bolts $s$ are inserted may be in the form of slots. The transverse frame-bar $c$ back of wheel $w$ serves to keep dirt from adhering to the wheel.

By welding the heads of bolts $m$ to the channel-shaped clamps $l$ the bolts are prevented from turning.

The inclined positions assumed by the blades of my tool-attachment $g$, in the rocking of the tool-carrying bar $d$ in working with my implement, causes the cultivating elements $g^2$, $g^3$, $g^4$ and $i$ to cut the roots of the weeds, and rake the same out of the ground, while breaking and loosening up and pulverizing the soil as mentioned.

The wheel $w$ I find convenient to make of a circular band in which is welded a single diametrically extending cross-bar $w'$ to which are welded hubs $w^2$. $w^3$ is a grease-cup.

The details of construction above given merely represent such as I found convenient; but I do not limit myself thereto, except in such particulars as essential to the principle of operation of my invention.

I claim:

1. In a cultivating implement of the character described, the combination of a frame having a rockable tool-carrying bar transversely pivoted therein, a two-piece tool removably attachable to said bar and adjustable thereon so that the pieces may be moved together and apart relatively to the width of the strip of ground to be cultivated, means for attaching said tool to said bar, and means limiting the rocking of said tool-carrying bar to arcs of predetermined degrees.

2. A cultivating implement comprising a frame including handle bars, a ground wheel journaled in the forward end of the frame, a tool-carrying slotted bar pivoted in the frame and rockable in either direction longitudinally by contact of the tool carried by the implement with the ground, a tool-attachment removably carried by said bar, such attachment consisting of two companion parts adjustably affixed to said bar and movable together and apart thereon relatively to the width of the strip of ground to be cultivated, means limiting the rocking of said tool-carrying bar to arcs of predetermined degrees.

3. A cultivating implement comprising a frame including handle bars, a ground wheel journaled in the forward end of the frame, a tool-carrying slotted bar pivoted in the frame and rockable in either direction longitudinally by contact of the tool carried by the implement with the ground, a working-tool attachment for said bar consisting of two companion parts, each comprising a shank having upper and lower portions projecting laterally in the same direction, the upper portion being slotted to receive fastening bolts inserted thru such slots and the slots of said tool-carrying bar, the lower portion constituting a blade provided with cultivating elements substantially as described, means limiting the rocking of said tool-carrying bar to arcs of predetermined degrees.

4. In a cultivating implement of the character described, the combination of a frame, a tool-carrying bar pivoted in and having limited arcuate movement in said frame, and a two-piece tool removably attachable to said bar and adjustable thereon, so that the component parts may be moved together and apart relatively to the width of the strip of ground to be cultivated.

OTTO HOFFMAN.